(12) United States Patent
Klimowych et al.

(10) Patent No.: US 9,042,698 B2
(45) Date of Patent: May 26, 2015

(54) BARE GLASS FIBER HOLDER

(75) Inventors: William R. Klimowych, Greenville, SC (US); Douglas Duke, Simpsonville, SC (US); Yoshiharu Kanda, Greer, SC (US)

(73) Assignee: AFL Telecommunications LLC, Spartanburg, SC (US)

( * ) Notice: Subject to any disclaimer, the term of this patent is extended or adjusted under 35 U.S.C. 154(b) by 85 days.

(21) Appl. No.: 13/636,757

(22) PCT Filed: Mar. 23, 2011

(86) PCT No.: PCT/US2011/029557
§ 371 (c)(1),
(2), (4) Date: Apr. 19, 2013

(87) PCT Pub. No.: WO2011/119682
PCT Pub. Date: Sep. 29, 2011

(65) Prior Publication Data
US 2013/0195413 A1    Aug. 1, 2013

Related U.S. Application Data

(60) Provisional application No. 61/316,529, filed on Mar. 23, 2010.

(51) Int. Cl.
*G02B 6/36* (2006.01)
*G02B 6/00* (2006.01)
*G02B 6/25* (2006.01)

(52) U.S. Cl.
CPC ... *G02B 6/00* (2013.01); *G02B 6/25* (2013.01)

(58) Field of Classification Search
CPC .............. G02B 6/00; G02B 6/36; G02B 6/04; G02B 6/02

USPC .......................................................... 385/134
See application file for complete search history.

(56) References Cited

U.S. PATENT DOCUMENTS

| 4,744,627 A | 5/1988 | Chande et al. |
| 5,024,363 A * | 6/1991 | Suda et al. ................... 225/96.5 |

(Continued)

FOREIGN PATENT DOCUMENTS

| JP | 2002040290 A * | 2/2002 | ............... G02B 6/36 |
| JP | 2005258129 A * | 9/2005 | ............... G02B 6/24 |

OTHER PUBLICATIONS

International Search Report of PCT/US2011/029557 dated Jun. 3, 2011.

*Primary Examiner* — Kaveh Kianni
(74) *Attorney, Agent, or Firm* — Sughrue Mion, PLLC

(57) ABSTRACT

A fiber holder is provided which includes first and second holder plates having first and second main surfaces, respectively. The first holder plate includes a first channel insert including a first fiber channel configured to receive a fiber therein, and a first insert channel disposed on the first main surface such that the first insert channel extends through a length of the first main surface and is configured to receive the first channel insert. The second holder plate includes a second channel insert including a second fiber channel configured to receive the fiber therein, and a second insert channel disposed on the second main surface such that the second insert channel extends through a length of the second main surface and is configured to receive the second channel insert. The first and second channel inserts are disposed within the first and second insert channels, respectively.

24 Claims, 2 Drawing Sheets

(56) References Cited

U.S. PATENT DOCUMENTS

| | | | |
|---|---|---|---|
| 5,046,813 A * | 9/1991 | Itoh et al. | 385/96 |
| 5,106,006 A * | 4/1992 | Suda et al. | 225/2 |
| 5,129,567 A * | 7/1992 | Suda et al. | 225/96.5 |
| 5,170,456 A * | 12/1992 | Itoh et al. | 385/96 |
| 5,377,289 A * | 12/1994 | Johnson et al. | 385/65 |
| 6,023,996 A * | 2/2000 | Dodge et al. | 81/9.51 |
| 7,502,542 B2 | 3/2009 | Fujisawa et al. | |
| 7,546,020 B2 | 6/2009 | Honma | |
| 7,669,744 B2 * | 3/2010 | Yazaki et al. | 225/1 |
| 8,245,405 B2 * | 8/2012 | Lu et al. | 30/90.4 |
| 2006/0067637 A1 | 3/2006 | Carpenter et al. | |
| 2006/0201982 A1* | 9/2006 | Yazaki et al. | 225/1 |
| 2009/0151167 A1* | 6/2009 | Lu et al. | 30/90.8 |
| 2011/0194821 A1* | 8/2011 | Fortusini et al. | 385/88 |

* cited by examiner

BARE GLASS FIBER HOLDER

CROSS-REFERENCE TO RELATED APPLICATIONS

This application claims priority from U.S. Provisional Application No. 61/316,529, filed on Mar. 23, 2010, the disclosure of which is incorporated herein by reference in its entirety.

BACKGROUND

1. Field

The present invention generally relates to a bare glass fiber holder, and more particularly, to a large diameter bare glass holder which holds optical fibers having a cladding diameter of about 230 μm or greater.

2. Description of the Related Art

High precision large diameter fibers (LDFs) cleavers have been developed which are designed for cleaving LDFs. An LDF, which typically has a cladding diameter from 230 μm up to 1000 μm or more in diameter produces cleaved angles within 0.5 degrees.

A built-in microprocessor of the cleaver controls all parameters and settings, such as clamping, tension and the exact position and speed of a diamond blade used for cutting or cleaving. This control of sensitive parameters is used to achieve a high cleaving repeatability and accuracy.

The fiber is held in place by a large diameter fiber holder which is used to load the fiber into the cleaver, and is critical to the accuracy of the cleaving. The LDF holder is selected to match the diameter of the fiber coating or jacket. A v-groove clamp block and a fiber height adjuster has to be selected to match the diameter of the fiber cladding.

The LDF holder as well as the v-groove clamp block, a height adjuster and a distance plate work together as a fiber handling system to ensure optimum cleaving performance for a particular fiber with a specific diameter, and these parts maybe exchanged by the operator to set the cleaver up for other fiber dimensions.

The cleaver is further designed to generate a minimum amount of fiber waste, typically less than 20 mm. An automatic waste disposal system removes any hazardous fiber scraps. The cleaver can be connected to an external computer that gives access to all programmable parameters and settings.

After a fiber is cleaved to the correct length, the cleaved fiber can be directly transferred to a splicer with no risk of touching or damaging the fiber end.

As noted above, the LDF holder is selected to match the diameter of the fiber coating or jacket. Accordingly, the coated or jacketed fiber is held in place by the LDF holder which is used to load the fiber in the cleaver. Enough clamping force must be used by the LDF holder to securely hold onto the coated or jacketed fiber such that an accurate cleave can be performed. However, when the fiber is not coated or jacketed (i.e., when the fiber is a bare glass fiber), it is difficult to clamp and hold the bare glass fiber in the fiber holder without breaking the fiber. Accordingly, because of the clamping force needed to securely hold onto the fiber, a bare glass fiber often breaks due to the applied pressure.

Furthermore, each time a different sized fiber is used, a different fiber holder must be selected, which is inconvenient.

Accordingly, an LDF holder that can firmly hold onto a bare glass fiber without breaking the fiber is needed. Furthermore, an LDF holder which can adapt to handle different sized fibers is needed.

SUMMARY

Exemplary embodiments of the general inventive concept invention may overcome the above disadvantages as well as other disadvantages not described above.

According to an exemplary embodiment, there is provided a fiber holder which includes a first holder plate having a first main surface and a second holder plate having a second main surface. The first holder plate includes a first channel insert including a first fiber channel configured to receive a fiber therein; and a first insert channel disposed on the first main surface such that the first insert channel extends through a length of the first main surface and is configured to receive the first channel insert. The first channel insert is disposed within the first insert channel. The second holder plate includes a second channel insert including a second fiber channel configured to receive the fiber therein; and a second insert channel disposed on the second main surface such that the second insert channel extends through a length of the second main surface and is configured to receive the second channel insert. The second channel insert is disposed within the second insert channel.

The first main surface faces towards the second main surface such that the first channel insert and the second channel insert are configured to at least partially enclose the fiber therebetween within the first and second fiber channels.

Furthermore, the first main surface faces towards the second main surface such that the first fiber channel and the first insert channel are disposed in overlapping alignment with the second fiber channel and the second insert channel, respectively.

The first holder plate may also include a first recess portion and a first insert stop disposed within the first recess portion, wherein the first insert stop includes a first fiber channel portion which forms a portion of the first fiber channel.

Similarly, the second holder plate may include a second recess portion and a second insert stop disposed within the second recess portion, wherein the second insert stop includes a second fiber channel portion which forms a portion of the second fiber channel.

The first holder plate and the second holder plate may be alternated between open and closed positions such that, when in the closed position, the first and second main surfaces are in abutting contact, and, when in the open position, the first and second main surfaces are not in abutting contact.

Furthermore, when the first holder plate and the second holder are in the closed position, the first and second channel inserts are configured to hold the fiber therebetween within the first and second fiber channels, and the first and second channel inserts are configured to be in abutting contact with the fiber.

The portion of the first fiber channel of the first insert stop is an end portion of the first fiber channel, and the portion of the second fiber channel of the second insert stop is an end portion of the second fiber channel.

When inserted into the first recess, the first insert stop prevents the first channel insert from slipping out of an end portion of the first insert channel.

Similarly, when inserted into the second recess, the second insert stop prevents the second channel insert from slipping out of an end portion of the second insert channel.

The first fiber channel portion of the first insert stop may have a diameter less than an outer diameter of the first channel insert and greater than a diameter of the fiber.

Similarly, the second fiber channel portion of the second insert stop may have a diameter less than an outer diameter of the second channel insert and greater than the diameter of the fiber.

The first insert stop partially covers an end portion of the first insert channel without interfering with the first fiber channel such that the first insert stop prevents the first channel insert from slipping out of the end portion of the first insert channel.

Similarly, the second insert stop partially covers an end portion of the second insert channel without interfering with the second fiber channel such that the second insert stop prevents the second channel insert from slipping out of the end portion of the second insert channel.

The fiber may be a large diameter bare glass optical fiber.

The first and second channel inserts may be made of silicone rubber.

BRIEF DESCRIPTION OF THE DRAWINGS

The above and other aspects of the present invention will become more apparent from the following description of exemplary embodiments, taken in conjunction with the accompanying drawings of which.

Throughout the drawings, the same drawing reference numerals will be understood to refer to the same elements, features, and structures.

DETAILED DESCRIPTION OF THE EXEMPLARY EMBODIMENTS

Figure 1:
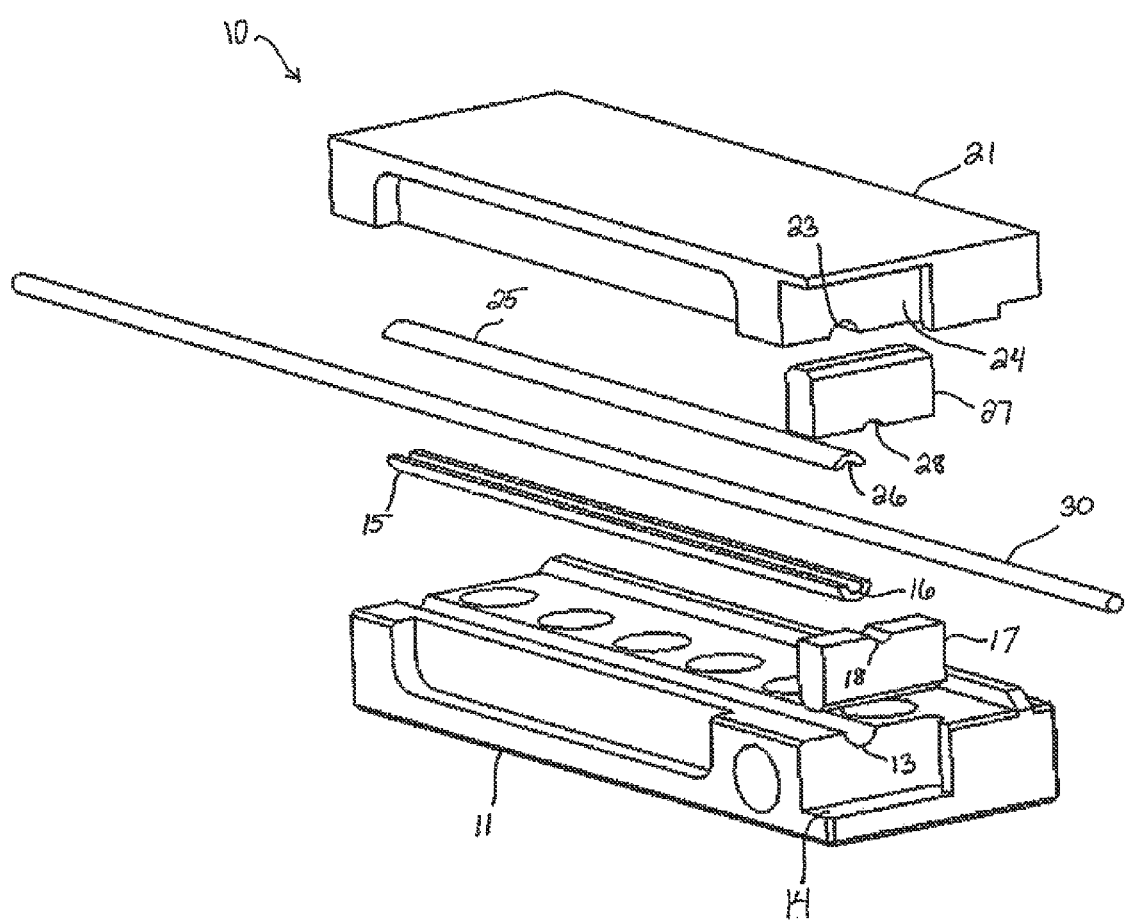
FIG. 1 illustrates an exploded perspective view of a fiber holder according to an exemplary embodiment.

The matters defined in the description such as a detailed construction and elements are provided to assist in a comprehensive understanding of the exemplary embodiments of the invention and are merely exemplary. Accordingly, those of ordinary skill in the art will recognize that various changes and modifications of the exemplary embodiments described herein can be made without departing from the scope and spirit of the general inventive concept. Also, descriptions of well-known functions and constructions are omitted for clarity and conciseness. In the following description, like drawing reference numerals are used for the like elements, even in different drawings.

According to the exemplary embodiments, a fiber holder is provided that can firmly hold a large diameter bare glass fiber (e.g., an optical fiber having a cladding diameter of 230 μm or greater) without slipping in an autocleave. Accordingly, the fiber holder may be referred to as a large diameter fiber (LDF) holder.

For example, during the cleaving process of a 1 mm diameter bare glass fiber the fiber holder grips approximately a 50 mm length-wise section of the bare glass fiber (i.e., uncoated fiber) between two silicone rubber inserts, which are embedded in the two channels or troughs of two aluminum holder plates. An insert stop, with a channel cutout having a diameter less than the outer diameter of the rubber insert, keeps the rubber inserts from slipping out of the fiber holder while pull or tension is applied to the fiber during cleaving.

Compression of the secured silicone rubber inserts against the bare glass fiber when closed prevents the fiber from slipping in the fiber holder. It is imperative that the inserts and the fiber be clean before using the fiber holder with the fiber, otherwise fiber slippage may occur.

FIG. 1 illustrates an exploded view of a fiber holder 10 according to an exemplary embodiment. The fiber holder 10 includes holder plates 11 and 21 where one of the holder plates 11/21 may be regarded as a fiber holder base and the other holder plate 11/21 may be regarded as a fiber holder lid. The holder plates 11 and 21 may be made of aluminum or another paramagnetic material.

The holder plate 11 includes an insert channel 13, which extends in an axial direction of the holder plate 11 and holds a bare glass fiber 30 therein, and a recess portion 14. Similarly, the holder plate 21 includes an insert channel 23, which extends in an axial direction of the holder plate 21 and holds the bare glass fiber 30 therein, and a recess portion 24. The insert channels 13 and 23 are provided in overlapping alignment with each other (e.g., in vertical alignment according to the arrangement shown in FIG. 1). Recess portions 14 and 24 are also positioned in a vertical alignment with each other, with both recess portions 14/24 being located at a same end of the fiber holder 10.

Each holder plate 11/21 is provided with a channel insert 15/25 which is inserted into a corresponding insert channel 13/23. The outer diameters of the channel inserts 15/25 are congruent, or substantially congruent, with the diameters of their corresponding insert channel 13/23, such that the channel inserts 15/25 are be embedded in their corresponding insert channel 13/23. The inner diameters of the channel inserts 15/25 define fiber channels 16/26 and are shaped to be congruent, or substantially congruent, with the outer diameter of the bare glass fiber 30 such that the bare glass fiber 30 is disposed therein. The channel inserts 15/25 may be made of silicone rubber and formed in the shape of a trough.

Figure 2:
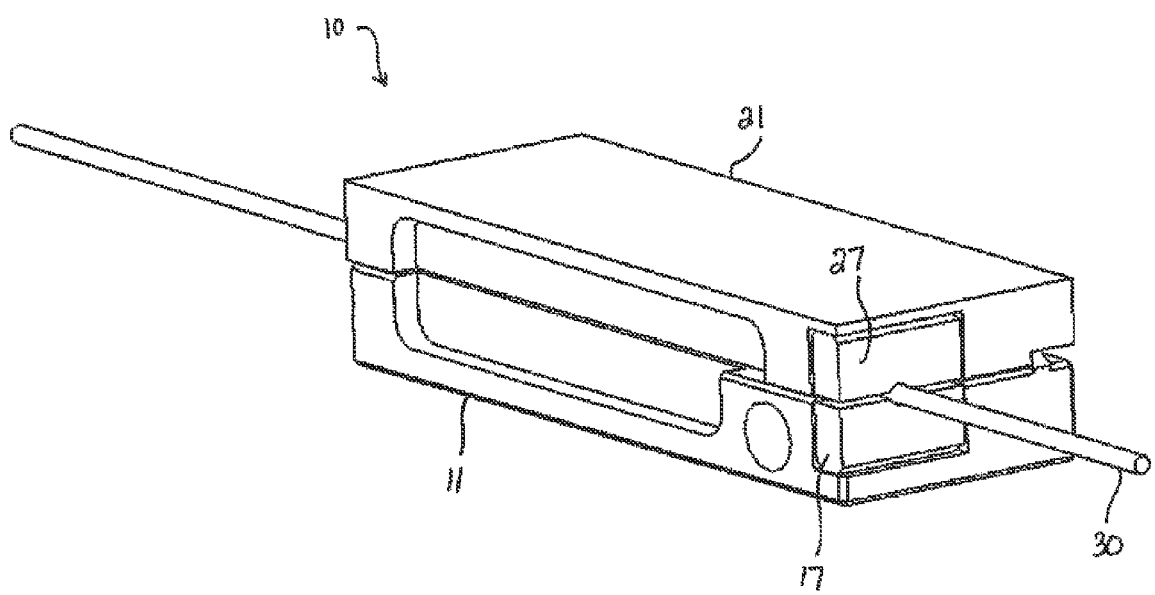
FIG. 2 illustrates a perspective view of the fiber holder in an assembled arrangement according to the exemplary embodiment.

Accordingly, when the fiber holder 10 is assembled, the holder plates 11/21 can be closed together, as shown in FIG. 2, such that a section of the bare glass fiber 30 is disposed between the channel inserts 15/25 within the fiber channels 16/26. When the bare glass fiber 30 rests within the fiber channels 16/26, both channel inserts 15/25 are in abutting contact with a portion of the surface of the bare glass fiber 30. Furthermore, when the holder plates 11/21 are closed together, the section of bare glass fiber 30 within the fiber channels 16/26 may be completely enclosed by the channel inserts 15/25 such that the entire surface of the bare glass fiber 30 enclosed by the channel inserts 15/25 and is in abutting contact with the channel inserts 15/25.

Since the fiber holder 10 may be used for various sizes of bare glass fibers, channel inserts with different sized inner diameters (i.e., different sized fiber channels 16/26) may swapped to more closely fit with the size of a bare glass fiber 30. Accordingly, the channel inserts 15/25 are removable and replaceable depending on the diameter size of the bare glass fiber 30 to be held by the fiber holder 10.

The channel inserts 15/25 may also be secured to the insert channels 13/23 by rubber epoxy, or the like.

Although the insert channels 13/23 are shown to be circular or U-shaped in FIG. 1, the shape of the insert channels 13/23 is not limited thereto as long as the shape of the outer surface of the channel inserts 15/25 is congruent, or substantially congruent, with the shape of the insert channels 13/23.

Each holder plate 11/21 is provided with an insert stop 17/27 which are inserted into corresponding recess portions 14/24 and coupled to corresponding holder plates 11/21. For example, the recess portions 14/24 may be slots having a particular shape, and the inserts stops 17/27 may have a shape that is congruent to be inserted into the slots such that the insert stops 17/27 are snugly fitted into the slots to interlock therein. Alternatively, the insert stops 17/27 may be secured to the holder plate 11/21 by a fastener such as a screw, or the like.

The insert stops can also be integrated features of the holder plates 11/21, as part of the plate design, thereby eliminating the need for insert stops 17/27 which are separate from the holder plates 11/21.

Accordingly, the channel inserts 15/25 butt into their corresponding insert stop 17/27 at the cleaving side of each half assembly (i.e., of each holder plate 11/21).

In particular, the insert stop 17 is provided with a fiber channel 18 which has a diameter less than the outer diameter of the channel insert 15 and greater than the diameter of the bare glass fiber 30 such that a section of the fiber 30 is disposed therein. The fiber channel 18 is aligned with the fiber channel 16 formed by the channel insert 15 such that the fiber 30 extends within both fiber channels 16 and 18. That is, the fiber channels 16 and 18 form a single fiber channel.

Accordingly, by inserting the insert stop 17 into recess portion 14 and coupling the insert stop 17 to the holder plate 11, the insert stop 17 partially blocks the insert channel 13 and the channel insert 15 without interfering with or blocking the fiber channel 16. Thus, by inserting the insert stop 17 into recess portion 14 and coupling the insert stop 17 to the holder plate 11, the insert stop 17 prevents the channel insert 15 from slipping out of the holder plate 11 while pull or tension is applied to the fiber 30 during cleaving. That is, the insert stop 17 helps to secure the channel insert 15 in the insert channel 13.

Similarly, the insert stop 27 is provided with a fiber channel 28 which has a diameter less than the outer diameter of the channel insert 25 and greater than the diameter of the bare glass fiber 30 such that a section of the fiber 30 is disposed therein. The fiber channel 28 is aligned with the fiber channel 26 formed by the channel insert 25 such that the fiber 30 extends within both fiber channels 26 and 28. That is, the fiber channels 26 and 28 form a single fiber channel.

Accordingly, by inserting the insert stop 27 into recess portion 24 and coupling the insert stop 27 to the holder plate 21, the insert stop 27 partially blocks the insert channel 23 and the channel insert 25 without interfering with or blocking the fiber channel 26. Thus, by inserting the insert stop 27 into recess portion 24 and coupling the insert stop 27 to the holder plate 21, the insert stop 27 prevents the channel insert 25 from slipping out of the holder plate 21 while pull or tension is applied to the fiber 30 during cleaving. That is, the insert stop 27 helps to secure the channel insert 25 in the insert channel 23.

In addition, since the fiber holder 10 may be used for various sizes of bare glass fibers, insert stops with different sized diameters (i.e., different sized fiber channels) may swapped to more closely fit with the size of a bare glass fiber 30. Accordingly, the insert stops 17/27 are removable and replaceable depending on the diameter size of the bare glass fiber 30 to be held within their corresponding channels 18/28.

Alternatively, a lip provided at the cleaving side may be used instead of the insert stop 17/27 to prevent the channel insert 15/25 from slipping out of the holder plate 11/21.

Accordingly, the holder plates 11 and 21 have mirror symmetry with respect to the above features (e.g., insert channels 13/23, recess portions 14/24, channel inserts 15/25, fiber channels 16/26, insert stops 17/27 and fiber channels 18/28).

With the channel inserts 15/25 secured in the insert channels 13/23, compression of the secured silicone rubber inserts 15/25 against the bare glass fiber 30 when the fiber holder 10 is closed prevents the bare glass fiber 30 from slipping in the fiber holder 10. Furthermore, the channel inserts 15/25 prevent breaking of the bare glass fiber 30 while the fiber 30 is clamped in the fiber holder 10 and cleaved.

FIG. 2 illustrates a view of the fiber holder 10 in an assembled arrangement according to the exemplary embodiment. In particular, FIG. 2 shows the fiber holder 10 in a closed position in which main surfaces of the holder plates 11 and 21 are in abutting contact with each other. Accordingly, the holder plates 11/21, insert stops 17/21 and a portion of the fiber 30 are shown, whereas the channel inserts 15/25 and a section of the fiber 30 are disposed within the closed fiber holder 10. Alternatively, when the fiber holder 10 is in an open position, the main surfaces of the holder plates 11 and 21 are not in abutting contact with each other (not shown).

The holder plates 11 and 21 may be alternated between open and closed positions. For example, a magnetic field may be applied to the holder plates 11 and 21 such that the holder plates 11 and 21 are magnetically locked together. Additionally, each holder plate 11/21 may have magnet inserts which lock the holder plates 11/21 together. When the holder plates 11 and 21 are in a closed position, the channel inserts 15/25 close in on a section of the bare glass fiber 30 (e.g., approximately a 50 mm length-wise section of the bare glass fiber 30) and make abutting contact with the fiber 30. That is, a through-hole is formed by fiber channels 16/26 in which the fiber 30 may reside. Accordingly, the channel inserts 15/25 clamp the section of the bare glass fiber 30 such that the channel inserts 15/25 grip and firmly hold the bare glass fiber 30 in place without damaging the bare glass fiber 30 while pull or tension is applied to the fiber 30 during cleaving.

When the holder plates 11 and 21 are in an open position, the bare glass fiber 30 is released from the hold of the fiber holder 10, and a new section of the bare glass fiber 30 can be fed into the fiber holder 10.

In order to move holder plates 11 and 21 towards and away from each other, a plate moving mechanism coupled to each plate may be provided which moves the plates towards and away from each other according to a controlled operation, which is controlled by a controller (e.g., a microprocessor). Alternatively, or additionally, the holder plates 11 and 21 may moved together by applying a magnetic field thereto according to a controlled operation.

Accordingly, the fiber holder 10 may be provided in a high precision LDF cleaver that is designed for cleaving large diameter bare glass fibers and which produces cleaved angles within 0.5 degrees. The fiber holder 10 is capable of holding an optical fiber (LDF) having a cladding diameter of 230 µm or greater, including a range of 230 µm to 1300 µm, and more preferably a range of 230 µm to 1000 µm).

For example, during a cleaving process, a large diameter uncoated fiber 30 is placed within the fiber channel 16 of the channel insert 15. The holder plate 21, which serves as a lid, is carefully moved in place on top of the holder plate 11, which serves as a base, and is automatically aligned and secured in place by magnet inserts provided in the base and lid. When the fiber holder assembly 10 is closed, the rubber channel inserts 15/25 squeeze the glass of the fiber 30 enough to secure the fiber 30 within the fiber holder assembly 10 without breaking the fiber 30. Accordingly, the silicone rubber inserts 15/25 themselves behave like an ancillary coating for the glass fiber 30 to keep it from slipping in the fiber holder 10.

A built-in microprocessor of the cleaver may control all parameters and settings, such as clamping, moving and/or magnetizing the holder plates 11 and 21, tension on the fiber 30 and the exact position and speed of a diamond blade used for cutting or cleaving the fiber 30. This control of sensitive parameters is used to achieve a high cleaving repeatability and accuracy.

The fiber 30 is held in place by the large diameter fiber holder 10 which is used to load the fiber 30 into the cleaver, and helps to ensure the accuracy of the cleaving.

Accordingly, the fiber 30 is held in place by the large diameter fiber holder 10 which is used to load the fiber 30 in the cleaver, and is critical to the accuracy of the cleave.

The cleaver may be connected to an external computer that gives access to all programmable parameters and settings.

After a fiber is cleaved to the correct length, the cleaved fiber can be directly transferred to a splicer with no risk of touching or damaging the fiber end.

What is claimed is:

1. A fiber holder comprising:
a first holder plate having a first main surface, the first holder plate comprising:
a first channel insert comprising a first fiber channel configured to receive a fiber therein; and
a first insert channel disposed on the first main surface such that the first insert channel extends through a length of the first main surface and is configured to receive the first channel insert,
wherein the first channel insert is disposed within the first insert channel; and
a second holder plate having a second main surface, the second holder plate comprising:
a second channel insert comprising a second fiber channel configured to receive the fiber therein; and
a second insert channel disposed on the second main surface such that the second insert channel extends through a length of the second main surface and is configured to receive the second channel insert,
wherein the second channel insert is disposed within the second insert channel, and
wherein the first channel insert and second channel insert are separate channel inserts.

2. The fiber holder of claim 1, wherein the first main surface faces towards the second main surface such that the first channel insert and the second channel insert are configured to at least partially enclose the fiber therebetween within the first and second fiber channels.

3. The fiber holder of claim 2, wherein the first main surface faces towards the second main surface such that the first fiber channel and the first insert channel are disposed in overlapping alignment with the second fiber channel and the second insert channel, respectively.

4. The fiber holder of claim 1, wherein the fiber is a large diameter bare glass optical fiber.

5. A fiber holder comprising:
a first holder plate having a first main surface, the first holder plate comprising:
a first channel insert comprising a first fiber channel configured to receive a fiber therein; and
a first insert channel disposed on the first main surface such that the first insert channel extends through a length of the first main surface and is configured to receive the first channel insert;
a second holder plate having a second main surface, the second holder plate comprising:
a second channel insert comprising a second fiber channel configured to receive the fiber therein; and
a second insert channel disposed on the second main surface such that the second insert channel extends through a length of the second main surface and is configured to receive the second channel insert,
wherein:
the first channel insert is disposed within the first insert channel;
the second channel insert is disposed within the second insert channel;
the first main surface faces towards the second main surface such that the first channel insert and the second channel insert are configured to at least partially enclose the fiber therebetween within the first and second fiber channels;
the first holder plate further comprises a first recess portion and a first insert stop disposed within the first recess portion, and the first insert stop comprises a first fiber channel portion which forms a portion of the first fiber channel; and
the second holder plate further comprises a second recess portion and a second insert stop disposed within the second recess portion, and the second insert stop comprises a second fiber channel portion which forms a portion of the second fiber channel.

6. The fiber holder of claim 5, wherein the first main surface faces towards the second main surface such that the first fiber channel and the first insert channel are disposed in overlapping alignment with the second fiber channel and the second insert channel, respectively.

7. The fiber holder of claim 5, wherein the fiber is a large diameter bare glass optical fiber.

8. A fiber holder comprising:
a first holder plate having a first main surface, the first holder plate comprising:
a first channel insert comprising a first fiber channel configured to receive a fiber therein; and
a first insert channel disposed on the first main surface such that the first insert channel extends through a length of the first main surface and is configured to receive the first channel insert;
a second holder plate having a second main surface, the second holder plate comprising:
a second channel insert comprising a second fiber channel configured to receive the fiber therein; and
a second insert channel disposed on the second main surface such that the second insert channel extends through a length of the second main surface and is configured to receive the second channel insert,
wherein:
the first channel insert is disposed within the first insert channel;
the second channel insert is disposed within the second insert channel; and
the first holder plate and the second holder plate are alternated between open and closed positions such that, when in the closed position, the first and second main surfaces are in abutting contact, and, when in the open position, the first and second main surfaces are not in abutting contact.

9. The fiber holder of claim 8, wherein, when the first holder plate and the second holder are in the closed position, the first and second channel inserts are configured to hold the fiber therebetween within the first and second fiber channels, and the first and second channel inserts are configured to be in abutting contact with the fiber.

10. The fiber holder of claim 8, wherein the first main surface faces towards the second main surface such that the first channel insert and the second channel insert are configured to at least partially enclose the fiber therebetween within the first fiber channel and the second fiber channel.

11. The fiber holder of claim 10, wherein the first main surface faces towards the second main surface such that the first fiber channel and the first insert channel are disposed in overlapping alignment with the second fiber channel and the second insert channel, respectively.

12. The fiber holder of claim 8, wherein the fiber is a large diameter bare glass optical fiber.

13. A fiber holder comprising:
a first holder plate having a first main surface, the first holder plate comprising:
  a first channel insert comprising a first fiber channel configured to receive a fiber therein; and
  a first insert channel disposed on the first main surface such that the first insert channel extends through a length of the first main surface and is configured to receive the first channel insert;
a second holder plate having a second main surface, the second holder plate comprising:
  a second channel insert comprising a second fiber channel configured to receive the fiber therein; and
  a second insert channel disposed on the second main surface such that the second insert channel extends through a length of the second main surface and is configured to receive the second channel insert,
wherein:
  the first channel insert is disposed within the first insert channel;
  the second channel insert is disposed within the second insert channel;
  the first holder plate further comprises a first recess portion and a first insert stop disposed within the first recess portion, and the first insert stop comprises a first fiber channel portion which forms a portion of the first fiber channel; and
  the second holder plate further comprises a second recess portion and a second insert stop disposed within the second recess portion, and the second insert stop comprises a second fiber channel portion which forms a portion of the second fiber channel.

14. The fiber holder of claim 13, wherein the portion of the first fiber channel is an end portion of the first fiber channel, and the portion of the second fiber channel is an end portion of the second fiber channel.

15. The fiber holder of claim 13, wherein the first insert stop prevents the first channel insert from slipping out of an end portion of the first insert channel, and the second insert stop prevents the second channel insert from slipping out of an end portion of the second insert channel.

16. The fiber holder of claim 13, wherein the first fiber channel portion has a diameter less than an outer diameter of the first channel insert and greater than a diameter of the fiber, and
the second fiber channel portion has a diameter less than an outer diameter of the second channel insert and greater than the diameter of the fiber.

17. The fiber holder of claim 13, wherein the first insert stop partially covers an end portion of the first insert channel without interfering with the first fiber channel, and the first insert stop prevents the first channel insert from slipping out of the end portion of the first insert channel, and the second insert stop partially covers an end portion of the second insert channel without interfering with the second fiber channel, and the second insert stop prevents the second channel insert from slipping out of the end portion of the second insert channel.

18. The fiber holder of claim 13, wherein the first main surface faces towards the second main surface such that the first channel insert and the second channel insert are configured to at least partially enclose the fiber therebetween within the first fiber channel and the second fiber channel.

19. The fiber holder of claim 18, wherein the first main surface faces towards the second main surface such that the first fiber channel and the first insert channel are disposed in overlapping alignment with the second fiber channel and the second insert channel, respectively.

20. The fiber holder of claim 13, wherein the fiber is a large diameter bare glass optical fiber.

21. A fiber holder comprising:
a first holder plate having a first main surface, the first holder plate comprising:
  a first channel insert comprising a first fiber channel configured to receive a fiber therein; and
  a first insert channel disposed on the first main surface such that the first insert channel extends through a length of the first main surface and is configured to receive the first channel insert;
a second holder plate having a second main surface, the second holder plate comprising:
  a second channel insert comprising a second fiber channel configured to receive the fiber therein; and
  a second insert channel disposed on the second main surface such that the second insert channel extends through a length of the second main surface and is configured to receive the second channel insert,
wherein:
  the first channel insert is disposed within the first insert channel;
  the second channel insert is disposed within the second insert channel; and
  the first and second channel inserts are made of silicone rubber.

22. The fiber holder of claim 21, wherein the first main surface faces towards the second main surface such that the first channel insert and the second channel insert are configured to at least partially enclose the fiber therebetween within the first fiber channel and the second fiber channel.

23. The fiber holder of claim 22, wherein the first main surface faces towards the second main surface such that the first fiber channel and the first insert channel are disposed in overlapping alignment with the second fiber channel and the second insert channel, respectively.

24. The fiber holder of claim 21, wherein the fiber is a large diameter bare glass optical fiber.

* * * * *